United States Patent [19]
Parsch et al.

[11] 4,274,020
[45] Jun. 16, 1981

[54] SYNCHRONOUS LINEAR MOTOR

[75] Inventors: Claus P. Parsch, Forchheim; John P. Gibson, Fürth-Vach, both of Fed. Rep. of Germany

[73] Assignee: Siemens Aktiengesellschaft, Berlin and Munich, Fed. Rep. of Germany

[21] Appl. No.: 79,101

[22] Filed: Sep. 26, 1979

[30] Foreign Application Priority Data

Sep. 27, 1978 [DE] Fed. Rep. of Germany ....... 2842099

[51] Int. Cl.³ ............................................. H02K 41/02
[52] U.S. Cl. ........................................ 310/13; 310/12; 318/135; 104/290
[58] Field of Search ..................... 104/290; 310/12–19; 318/121, 135

[56] References Cited

U.S. PATENT DOCUMENTS

| 4,068,152 | 1/1978 | Nakamura et al. ............... 310/12 X |
| 4,205,243 | 5/1980 | Lingaya ................................. 310/13 |

*Primary Examiner*—Donovan F. Duggan
*Attorney, Agent, or Firm*—Kenyon & Kenyon

[57] ABSTRACT

In a synchronous linear motor having a traveling field winding which is subdivided into switching sections, each of which is supplied from a converter with current carrying rails of the traveling field winding designed as conductor ribbons with several individual conductors, at a change of switching sections, the individual conductors of the conductor ribbons are interchanged consecutively in such a manner that individual conductors of the one switching section are successively brought out and individual conductors of the next switching section looped in at spacings which are integral multiples of a pole pitch division.

1 Claim, 2 Drawing Figures

SYNCHRONOUS LINEAR MOTOR

BACKGROUND OF THE INVENTION

This invention relates to synchronous linear motors in general and more particularly to an improved method of constructing transitions between the switching sections of a traveling field winding utilized in driving a track-bound vehicle.

Synchronous linear motors, especially long-stator motors, the exciter device of which is designed as a moving translator and is arranged on a track bound vehicle, and the traveling field winding of which is subdivided into switching sections which are installed in meander fashion along the line and are supplied by respective stationary controlled static converters; the current-carrying rails of the traveling field winding being realized as conductor ribbons with several individual conductors are described in German Offenlegungschrift No. 26 56 389.

SUMMARY OF THE INVENTION

It is an object of the present invention to construct the transitions between the switching sections of the traveling field winding in such a manner that the asymmetries for the current control of the converter arrangement when traveling over the transitions are reduced and adequate traveling comfort is assured.

According to the present invention, this problem is solved by interchanging the individual conductors of the conductor ribbons at a change of switching sections in such a manner that, at intervals which correspond to an integral multiple of a pole pitch division, one individual conductor of the one switching section is brought out and an individual conductor of the next switching section is looped in.

Through the overlapping transition between the switching sections of the traveling field winding according to the present invention, the drop of the main field voltage in the switching section left behind and the rise of the main field voltage in the next following switching section are delayed. Abrupt load changes for the converters supplying the switching sections are avoided. The current regulators associated with the individual converters can keep the current in the successive switching sections of the traveling field winding approximately constant. The transition of the vehicle from one switching section to the next is so soft that the traveling comfort is not impaired.

DETAILED DESCRIPTION OF THE INVENTION

Figure 1:
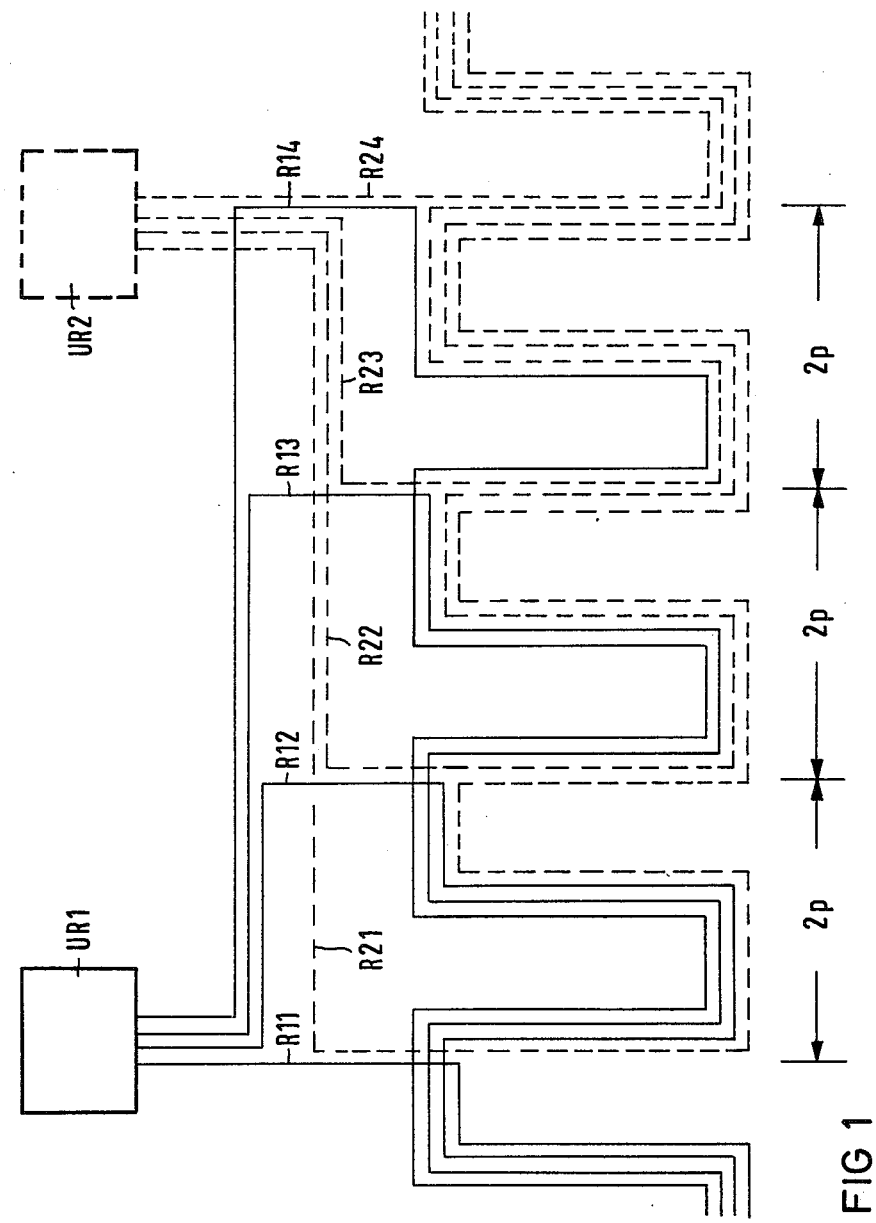
FIG. 1 is a schematically drawn transition between the switching sections of one phase of a traveling field winding, the current carrying rails of which are resolved into individual conductors and are electrically connected in parallel.

In FIG. 1, the transition between two succeeding switching sections of one phase of a multi-phase traveling field winding for a synchronous linear motor without iron is shown. For the sake of clarity, the individual conductors of the left switching section of the traveling field winding are shown with solid lines and the individual conductors of the right switching section of the traveling field winding with broken lines. It is assumed that the vehicle moves from left to right. In general, such a traveling field winding is designed for three phases. To simplify the presentation, only phase R of the traveling field winding is shown.

In the traveling field winding shown, the current carrying rails are designed as conductor ribbons with four individual conductors each. These are installed on the line side by side and are electrically connected in parallel. Each switching section is fed with a-c current of adjustable frequency, phase and amplitude from a converter assigned to it. The converter UR1 is assigned to the left switching section of phase R, the current carrying rail of which is composed of the individual conductors R11, R12, R13 and R14. The converter arrangement UR2 is assigned to the right switching section, the current-carrying rail of which is composed of the individual conductors R21, R22, R23 and R24. The transition between the two switching sections of phase R is arranged so that, first, the individual conductor R11 of phase R of the left switching section is brought out and the individual conductor R21 of phase R of the next following switching section is looped in. At a distance 2p, which corresponds to twice a pole pitch division p and therefore, to one wave length, the individual conductor R12 of the left switching section is brought out and the individual conductor R22 of the right switching section is inserted. At a distance which again corresponds to twice the pole pitch division, the individual conductor R13 is replaced by the individual conductor R23. After again twice the pole pitch division, finally the individual conductor R14 is also replaced by the individual conductor R24. Therewith, the transition from phase R of the left switching section with the individual conductors shown in solid lines to phase R of the right switching section with the individual conductors shown in the broken lines is completed. Since the interchange of the individual conductors is made at a distance of one wave length, i.e., twice the pole pitch division, a design advantage is achieved in that the connections are always on the same side of the traveling field winding. Thereby, the wiring can be made simpler.

At a change of switching sections, the following processes take place with respect to phase R:

The vehicle is initially located in the left switching section, which is supplied from the converter UR1. The converter UR2 of the right switching section is switched off. As soon as the vehicle approaches the transition. The converter UR2 of the right switching section is connected into the circuit and synchronized with the converter UR1. The current in the right switching section is regulated to its niminal value by a current regulator associated with the converter UR2. The converter UR2 runs with no load. When the vehicle enters the right switching section, the exciter device induces a countervoltage in the right switching section which is designated as the main field voltage in synchronous linear motors. The converter UR2 of the right switching section increases the power delivered in order to hold the specified nominal current value. The converter UR1 of the switching section left behind is regulated down. As soon as the vehicle is completely in the right switching section, the converter of the left switching section is shut down.

Because the transitions between the consecutive switching sections of the individual phases are designed with an overlap, the rise of the main field voltage in the right switching section is delayed. The current regulator of the converter is therefore able to hold the desired current value by a corresponding change of the drive. If, on the other hand, all individual conductors of the first switching section were brought out together in the transition from one switching section to the next one and the individual conductors of the next switching section were looped in together, a sudden rise of the main field voltage would occur when the separation point was traversed. The current regulator of the converter could not follow this rise fast enough in view of the load current capability of the semiconductor valves of the converter. This would lead to undesirable power fluctuations which would impair the travel comfort.

Figure 2:
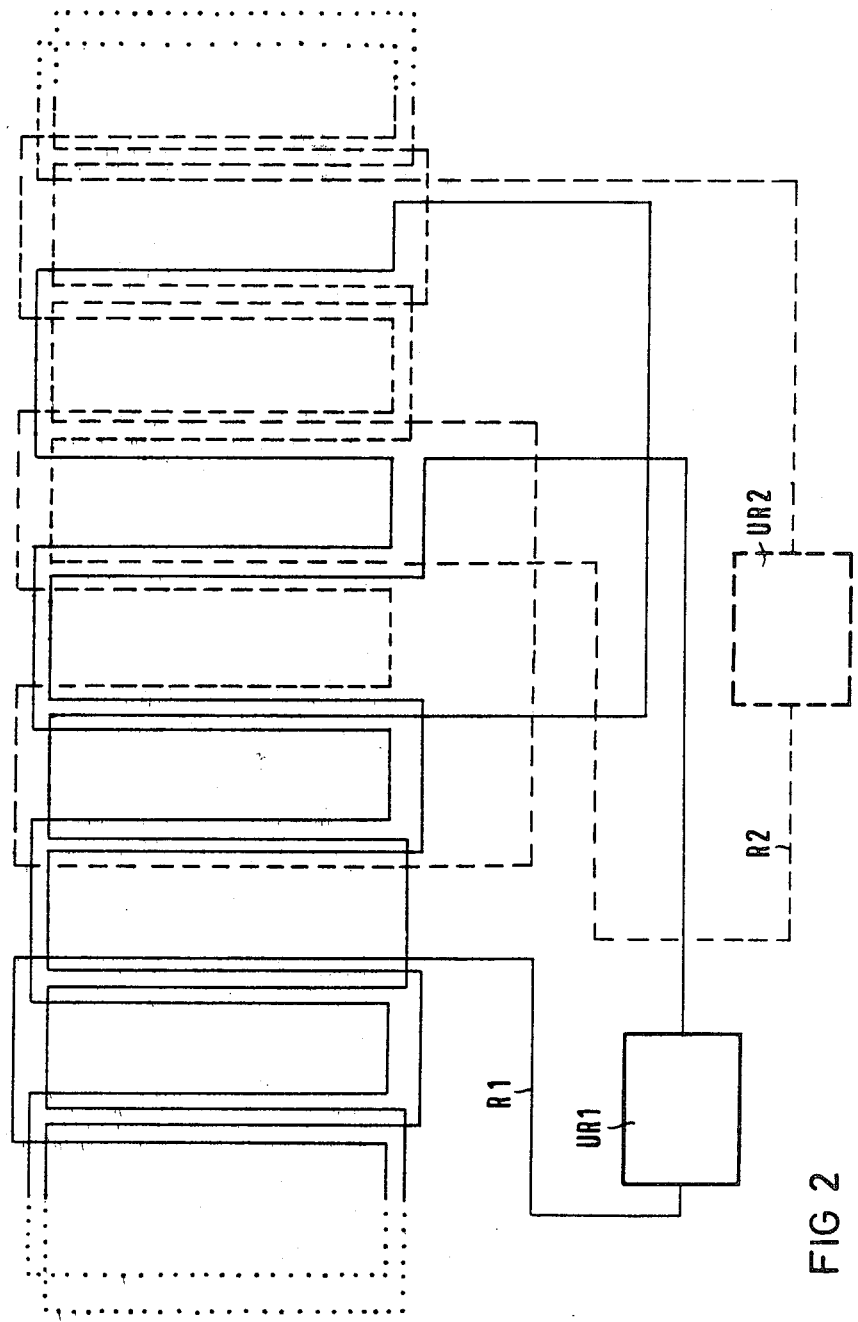
FIG. 2 is a schematically drawn transition between the switching sections of one phase of a traveling field winding, the current carrying rails of which are resolved into individual conductors and are electrically connected in series.

FIG. 2 shows an embodiment of the invention for one phase of a traveling field winding, in which the individual conductors of the conductor ribbons are connected in series.

In the left switching section, a conductor R1, shown as a solid line, is connected to the converter UR1. The conductor R1 is installed in meander shaped windings on the line in such a manner that the adjacent conductor sections always have the same direction of current flow. The individual windings are connected in series at the end of the switching section, as is shown schematically by the dotted lines. The right switching section consists of a conductor R2, shown in dashed lines, which is installed in the same manner and is connected to the converter UR2. The transition from the left switching section to the right switching section is accomplished by bringing out a first winding of the conductor R1 and looping in a first winding of the conductor R2. After one wave length 2p, a further winding of the conductor R1 is brought out and a further winding of the conductor R2 looped in. After one pole pitch p, a third winding of the conductor R1 is exchanged for a third winding of the conductor R2. The exchange of the fourth winding takes place again after a wave length 2p. The spacings at which the windings are interchanged are therefore one or two pole pitch divisions. This has the design advantage that the exchange of the windings can always be done on the same side. However, it is also possible to exchange the windings at uniform spacings, especially always after one wave length.

In applying the invention to a three phase traveling field winding, the individual conductors of each phase of a switching section can also be connected to the neutral point. The design of the transition in accordance with the present invention between two consecutive switching sections in not influenced thereby.

The invention can be used in a synchronous linear motor without iron and with iron.

What is claimed is:

1. In a synchronous linear motor, especially a long stator motor, the excitation device of which is designed as a moving translator and is arranged on a track-bound vehicle, having a traveling field winding divided into switching sections which are installed in meander fashion along the line and supplied from respective stationary controlled static converters, the current carrying rails of the traveling field winding being designed as conductor ribbons with several individual conductors, the improvement comprising, at a change of switching sections, the individual conductors of the conductor ribbons being sequentially interchanged in such a manner that, at intervals which correspond to an integral multiple of a pole pitch division, successive individual conductors of the one switching section are brought out and individual conductors of the next switching section looped in.

* * * * *